United States Patent
Pirig et al.

(12) 
(10) Patent No.: US 6,617,382 B1
(45) Date of Patent: Sep. 9, 2003

(54) FLAME-RETARDANT COATING FOR FIBER MATERIALS

(75) Inventors: Wolf-Dieter Pirig, Euskirchen (DE); Volker Thewes, Monheim (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/561,070

(22) Filed: Apr. 28, 2000

(30) Foreign Application Priority Data

Apr. 30, 1999 (DE) .......................................... 199 19 707

(51) Int. Cl.$^7$ ................................................. C08K 5/49
(52) U.S. Cl. ........................ 524/115; 524/100; 524/101; 524/102; 524/136
(58) Field of Search ................................. 524/115, 100, 524/101, 102, 136

(56) References Cited

U.S. PATENT DOCUMENTS

| | | | | |
|---|---|---|---|---|
| 4,145,296 A | * | 3/1979 | Fox .............................. | 252/8.1 |
| 4,853,424 A | | 8/1989 | Staendeke et al. ........... | 523/506 |
| 5,204,392 A | | 4/1993 | Nalepa et al. ............... | 524/101 |
| 5,204,393 A | | 4/1993 | Nalepa et al. ............... | 524/101 |
| 5,759,691 A | | 6/1998 | Scholz et al. ............... | 428/413 |
| 5,759,692 A | | 6/1998 | Scholz et al. ............... | 428/413 |
| 6,054,513 A | | 4/2000 | Pirig et al. ................... | 524/100 |
| 6,166,114 A | * | 12/2000 | Cosstick ...................... | 524/100 |
| 6,207,735 B1 | * | 3/2001 | Kuma ........................... | 524/100 |
| 6,251,961 B1 | | 6/2001 | Pirig et al. ................... | 521/179 |

FOREIGN PATENT DOCUMENTS

| | | |
|---|---|---|
| GB | 2 272 444 | 5/1994 |
| WO | WO 97/44377 | 11/1997 |
| WO | WO 98/08898 | 3/1998 |
| WO | WO 98/45364 | 10/1998 |
| WO | WO 99/11702 | 3/1999 |
| WO | WO 00/02869 | 1/2000 |

OTHER PUBLICATIONS

EPO Search Report.
Derwent Patent Family Abstract XP–002143899.

* cited by examiner

Primary Examiner—Edward J. Cain
(74) Attorney, Agent, or Firm—Anthony A. Bisulca

(57) ABSTRACT

The invention relates to a flame-retardant coating for fiber materials comprising at least one film-forming binder and one flame retardant, wherein this comprises melamine polyphosphate as flame retardant.

The invention also relates to the use of the novel flame-retardant coating for producing flame-retardant fiber materials.

12 Claims, No Drawings

FLAME-RETARDANT COATING FOR FIBER MATERIALS

BACKGROUND OF THE INVENTION

The invention relates to a flame-retardant coating for fiber materials comprising at least one film-forming binder and one flame retardant, and to the use of a flame-retardant coating of this type.

Fiber materials, for example in the form of textile sheets, such as fabrics for drapes, carpeting, covers for automobile seats, railroad seats, or covers for children's beds, etc. composed of, for example, cotton, cellulose fibers, polyester fibers, polyethylene fibers, polyamide fibers, polypropylene fibers or fiber mixtures ignite readily in the event of a fire.

It is known that textiles can be treated with compositions of decabromodiphenyl ether and other flame retardants, such as antimony trioxide and alumina trihydrate in the form of aqueous dispersions, in order to render them flame-retardant. These coatings contain halogen and therefore are in many cases not usable, in particular for textiles with which children come into contact.

Many attempts have therefore been made to replace these halogen-containing products with halogen-free products. Examples of halogen-free products used hitherto to render textiles flame-retardant are the known ammonium and sodium salts of phosphoric acid.

Disadvantages of these products are that firstly they do not give a satisfactory flame-retardant effect on fiber materials, and secondly that their high water solubility means that they are very rapidly removed as a result of washing.

Compositions of this type based on ammonium polyphosphate have given a more favorable result in this context insofar as water solubility and the effectiveness of flame-retardant action is concerned, but these are still not completely satisfactory. For example, ammonium polyphosphate tends to become tacky ("froggy hand") in the presence of moisture.

SUMMARY OF THE INVENTION

The object of the present invention is therefore to provide a flame-retardant coating for fiber materials which avoids the disadvantages mentioned and is as good as previous compositions with respect to flame-retardant action and also "froggy hand" and superior to these in terms of freedom from halogen.

This object is achieved by a flame-retardant coating for fiber materials of the type described at the outset, wherein this comprises melamine polyphosphate as flame retardant.

DESCRIPTION OF THE PREFERRED EMBODIMENT

The melamine polyphosphate preferably has the formula $(HMPO_3)_n$, where M is melamine and $n \geq 2$, in particular from 2 to 10,000.

Melamine polyphosphate is a polymer composed of melamine units and phosphate units, linked to form chains of varying length. The distribution of the melamine units and phosphate units may be regular or irregular, and they may, if desired, also have been polymerized within themselves. Derivatives of melamine, such as melem, melam and others, may also be present.

The properties of the melamine polyphosphate may vary within certain limits due to variations in its chain length and in the distribution and/or frequency of the melamine units and phosphate units.

Melamine polyphosphate is described in more detail in PCT/WO 98/45364, for example, where it is also termed melamine salt of polyphosphoric acid. The polymeric chain here is composed of $(HMPO_3)_n$ units [where M is melamine] and $n \geq 2$, in particular from 5 to 10,000.

Melamine polyphosphate is usually obtained by heating melamine pyrophosphate to constant weight under nitrogen at a temperature of 290° C. or above (PCT/WO 98/08898).

It is preferable for the film-forming binder to be
homopolymers based on vinyl acetate,
copolymers based on vinyl acetate, ethylene and vinyl chloride,
copolymers based on vinyl acetate and on the vinyl ester of a long-chain, branched carboxylic acid, copolymers based on vinyl acetate and di-n-butyl maleate,
copolymers based on vinyl acetate and acrylates, and/or
copolymers based on acrylates,
vinyltoluene-acrylate polymers,
styrene-acrylate polymers,
vinyl-acrylate copolymers, and/or
self-crosslinking polyurethane dispersions.

It is particularly preferable for the film-forming binder to be polyvinyl acetate copolymers or polyacrylates.

It is preferable for the ratio between the amount of film-forming binder (100% strength) and melamine polyphosphate to be from (10 to 1) to (1 to 5).

It is particularly preferable for the ratio between the amount of film-forming binder (100% strength) and melamine polyphosphate to be from (5 to 1) to (1 to 3).

It is preferable for water, and also, if desired, conventional auxiliaries and additives, to be present as further components.

It is preferable for the auxiliaries and additives present to comprise dispersing agents, foaming agents, foam stabilizers, thickeners, fungicides and/or antifoams.

It is preferable for the fiber materials to be fabrics for drapes, carpeting, covers for automobile seats or for railroad seats, or covers for children's beds, composed of cotton, cellulose fibers, polyester fibers, polyethylene fibers, polyamide fibers, polypropylene fibers and/or other fiber mixtures.

The novel flame-retardant coating is suitable for practically any conceivable fiber material, and its use is therefore not restricted to the abovementioned application sectors.

Finally, the invention also provides the use of the novel flame-retardant coating for producing flame-retardant fiber materials.

In each of the examples below, a flame-retardant coating is first produced, and a certain thickness of this is applied to the appropriate fiber materials and dried. Depending on the nature and composition of the flame-retardant coating and of the fiber material in the fabric the product may then, if desired, be foamed, dried or crosslinked.

The coatings were then tested to the following standards:

for fire protection regulations in buildings:
DIN 4102 Part 1
for automobiles: FMVSS 302
for railroads: DIN 54336.

The freedom from tack of the coatings applied was assessed visually after storage under appropriate temperature and humidity conditions.

The invention is illustrated by the examples below.

EXAMPLES

Example 1 (Comparison)

Reverse-side coating for automotive insulating material

| | |
|---|---|
| Polyvinyl acetate dispersion (50% strength) | 600 g/l |
| Decabromodiphenyl ether | 80 g/l |
| Antimony trioxide | 40 g/l |
| Alumina trihydrate | 80 g/l |
| Foaming agent | 5 g/l |
| Application: | |
| 1. Foaming | |
| 2. Amount applied | 180 µm |
| 3. Drying | at 150° C. |
| 4. Coating weight | 100 g/m² |
| Flammability test: FMVSS 302 | |
| Result: SE | |
| Moisture test (storage at 40° C. and 95% humidity for 24 h): no tack | |

Example 2 (Comparison)

| | |
|---|---|
| PVA dispersion (50% strength) | 600 g/l |
| Ammonium polyphosphate, solubility <0.1% | 120 g/l |
| Melamine | 40 g/l |
| Dipentaerythritol | 30 g/l |
| Dispersing agent | 2 g/l |
| Foaming agent | 5 g/l |
| Application: | |
| 1. Foaming | |
| 2. Amount applied | 180 µm |
| 3. Drying | at 150° C. |
| 4. Coating weight | 100 g/m² |
| Flammability test: FMVSS 302 | |
| Result: SE | |
| Moisture test (as in Example 1): slight tack, disappearing on drying. | |

Example 3

| | |
|---|---|
| PVA dispersion (50% strength) | 600 g/l |
| Melamine polyphosphate | 160 g/l |
| Foaming agent | 5 g/l |
| Application: | |
| 1. Foaming | |
| 2. Amount applied | 180 µm |
| 3. Drying | at 150° C. |
| 4. Coating weight | 100 g/m² |
| Flammability test: FMVSS 302 | |

-continued

| | |
|---|---|
| Result: SE | |
| Moisture test (as in Example 1): absolutely tack-free | |

Example 4

Automotive and railroad seat covers

| | |
|---|---|
| Polyacrylate dispersion (45% strength) | 550 g/l |
| Water | 100 g/l |
| Melamine resin | 30 g/l |
| Melamine polyphosphate | 90 g/l |
| Foaming agent | 3 g/l |
| Foam stabilizer | 5 g/l |
| Application: | |
| 1. Foaming | |
| 2. Amount applied | 30 g of flame retardant per 100 g of fabric |
| 3. Drying | at 170° C. |
| Flammability test: | | a) Railroad seats: test methods as in E-DIN 54837
   Result: S 4, ST 2, SR 2
b) Automobile seats: FMVSS 302 test methods
   Result: SE Moisture test: (as in Example 1 and after 48 and 96 h): absolutely tack-free

Example 5

Carpet-back coating

| | |
|---|---|
| PVA copolymer dispersion (50% strength) | 100 parts |
| Melamine polyphosphate | 130 parts |
| Water | 30 parts |
| Application: | |
| 1. Amount applied | 300–400 g/m² |
| 2. Drying | at 130° C. |
| Flammability test: Test methods as in DIN 54336 | |
| Result: Vertical test, 3 sec. Flame application - 0 sec. after-flame | |

Example 6

Treatment of drapes (cotton fabric)

| | |
|---|---|
| Polyacrylate dispersion | 500 g/l |
| Water | 100 g/l |
| Melamine polyphosphate | 50 g/l |
| Application: | |
| 1. Amount applied | 170 g/m² |
| 2. Process: Padding | |
| Liquor pick-up after pinch-off: about 70%, based on the fabric weight. | |
| 3. Drying | at 120° C. |
| 4. Crosslinking | 2 minutes at 170° C. |
| Flammability test: | Test methods as in DIN 4102 Part 1 |
| Result: | a) starting fabric - B1 passed |
| | b) after 5 washing procedures in a washing machine with commercially available detergent - B1 passed |

| Treatment of drapes (cotton fabric) |
| --- |
| c) after 10 washing procedures - as b) - B1 passed |
| d) after 20 washing procedures - as b) - B1 borderline, but very good B2 result. |

What is claimed is:

1. A flame-retardant fiber material, comprising a fiber material and a flame-retardant coating on a surface of the fiber material, wherein the flame retardant coating includes at least one film-forming binder and one flame retardant, wherein the flame retardant is melamine polyphosphate.

2. The flame retardant fiber material as claimed in claim 1, wherein the melamine polyphosphate has the formula $(HMPO_3)$ where M is melamine and n is from 2 to 10,000.

3. The flame retardant fiber material as claimed in claim 1, wherein the film-forming binder is homopolymers based on vinyl acetate, copolymers based on vinyl acetate, ethylene and vinyl chloride, copolymers based on vinyl acetate and on the vinyl ester of a long chain, branched carboxylic acid, copolymers based on vinyl acetate and di-n-butyl maleate, copolymers based on vinyl acetate and acrylates, copolymers based on acrylates, vinyltoluene-acrylate polymers, styrene-acrylate polymers, vinyl-acrylate copolymers, or self-crosslinking polyurethane dispersions.

4. The flame retardant fiber material as claimed in claim 1, wherein the film-forming binder is polyvinyl acetate copolymers or polyacrylates.

5. The flame retardant fiber material as claimed in claim 1, wherein the ratio between the amount of film-forming binder (100% strength) and melamine polyphosphate is from (10 to 1) to (1 to 5).

6. The flame retardant fiber material as claimed in claim 1, wherein the ratio between the amount of film-forming binder (100% strength) and melamine polyphosphate is from (5 to 1) to (1 to 3).

7. The flame retardant fiber material as claimed in claim 1, wherein the flame retardant coating further comprises water.

8. The flame retardant fiber material as claimed in claim 1, wherein the fiber material is selected from the group consisting of cotton fibers, cellulose fibers, polyester fibers, polyethylene fibers, polyamide fibers, polypropylene fibers and mixtures thereof.

9. A flame-retardant article comprising the flame retardant fiber material as claimed in claim 1, wherein the flame-retardant article is selected from the group consisting of drapes carpets, automobile seat covers, railroad seat covers, and covers for childrens' beds.

10. The flame retardant fiber material as claim in claim 1, wherein the flame retardant coating further comprises at least one auxiliary or additive.

11. The flame retardant fiber material as claimed in claim 10, wherein the at least one auxiliary or additive is selected from the group consisting of dispersing agents, foaming agents, foam stabilizers, thickeners, fungicides, and antifoams.

12. A process for producing a flame retardant fiber comprising the step of apply to at least one surface of the fiber a flame retardant coating, wherein the flame retardant coating includes at least one film-forming binder and at least one melamine polyphosphate flame retardant.

* * * * *